United States Patent [19]

Miwa et al.

[11] Patent Number: 4,644,421
[45] Date of Patent: Feb. 17, 1987

[54] METHOD AND APPARATUS FOR RECORDING INFORMATION ON MAGNETIC DISK

[75] Inventors: Takahiro Miwa, Konan; Yoshihiko Hibino, Gifu, both of Japan

[73] Assignee: Brother Kogyo Kabushiki Kaisha, Aichi, Japan

[21] Appl. No.: 744,153

[22] Filed: Jun. 13, 1985

[30] Foreign Application Priority Data

Jun. 23, 1984 [JP] Japan ............... 59-129675

[51] Int. Cl.$^4$ ............ G11B 5/03; G11B 21/02
[52] U.S. Cl. ........................... 360/66; 360/75
[58] Field of Search ............ 360/66, 118, 75, 121

[56] References Cited

U.S. PATENT DOCUMENTS

| | | | |
|---|---|---|---|
| 3,860,959 | 1/1975 | Hanson | 360/57 |
| 4,068,268 | 1/1978 | Idemoto et al. | 360/77 |
| 4,164,781 | 8/1979 | Brown | 360/66 |
| 4,290,088 | 9/1981 | Beecrotr | 360/66 |
| 4,300,174 | 11/1981 | Harman et al. | 360/66 |
| 4,516,165 | 5/1985 | Cunningham et al. | 360/118 |

FOREIGN PATENT DOCUMENTS

| | | | |
|---|---|---|---|
| 4930730 | 8/1976 | Japan | 360/60 |
| 58-97104 | 12/1983 | Japan | 360/60 |

Primary Examiner—Vincent P. Canney
Attorney, Agent, or Firm—Parkhurst & Oliff

[57] ABSTRACT

A method and an apparatus for writing information on a magnetic disk by a single-gap magnetic head, wherein information is first written on a selected track and then the written information is partially erased along opposite edges of the written band. Alternatively, previously written information is first partially erased along one of opposite edges of the previously written band, then new information is written on the selected track, and the newly written information is partially erased along one of opposite edges of the newly written band remote from the above-indicated erased edge of the previously band information. In another alternative form, the previously written information is partially erased along opposite edges of the written band, and then new information is written on the selected track.

3 Claims, 12 Drawing Figures

METHOD AND APPARATUS FOR RECORDING INFORMATION ON MAGNETIC DISK

BACKGROUND OF THE INVENTION

1. Field of the Art

The present invention relates in general to a method and an apparatus for recording information on a magnetic disk, and more particularly to such information recording technology wherein the recording is effected by use of a simple single-gap magnetic head, in desired data storage track sectors which are selected with sector identification data recorded on the magnetic disk.

2. Related Art Statement

In a magnetic recording apparatus for writing or recording information on magnetic recording media in the form of a magnetic disk such as floppy or hard disks, it is difficult to position the magnetic head in exact alignment with the centerline of a selected track of the magnetic disk. More specifically, the accuracy of positioning of the magnetic head relative to the magnetic disk is inevitably affected by thermal expansion and contraction of the mangetic disk, variations in concentricity of the tracks due to interchanging of disks and other factors, as well as by a positioning error of the magnetic head. Failure to establish exact alignment of the magnetic head with respect to the selected track will cause incomplete erasure of the information previously recorded on the selected track. Namely, the prior information signals are partially left as remnants adjacent to the newly recorded band. In this event, the remnant information signals are read out together with the newly recorded information signals. Such inconveniences become more and more serious as the track density and the size of the magnetic disk are increased.

To assure precise positioning of the magnetic head relative to the magnetic disk, it is known to use a magnetic head arrangement which has two additional C-shaped cores each equipped with a coil wound thereon, in addition to a read/write core. These two additional cores are spaced from each other in a radial direction of the magnetic disk, and a difference in output of the respective coils is utilized to position the magnetic head with respect to the centerline of the selected track. An example of a magnetic recording apparatus using such a magnetic head arrangement is disclosed in Japanese Patent Application which was published in 1974 under Publication No. 49-30730. This type of apparatus permits exact alignment of the magnetic head with the selected track of the magnetic disk. However, the apparatus is complicated in the construction of the magnetic head, and in the control device for positioning the magnetic head. Thus, the known apparatus indicated above is disadvantageous for its comparatively high cost of manufacture.

In the meantime, another apparatus is known in which the magnetic head is offset a predetermined distance from the centerline of a selected track of the magnetic disk in opposite radial directions of the disk, so that the information previously recorded on the selected track is erased before new information is written. In this case, the previously recorded information is erased over a width which is sufficiently greater than a width of a newly recorded band. Consequently, all the remnants of the prior information signals may be completely erased. Japanese Patent Application laid open in 1983 under Laid-Open No. 58-97104 discloses such an apparatus. In this arrangement, the complete erasure of the prior information signals makes it unnecessary to establish extremely high accuracy of relative positioning between the magnetic head and the selected track of the magnetic disk. Accordingly, the construction of the magnetic head and the control system for positioning the magnetic head may be simplified. However, this advantage is offered at the sacrifice of a disadvantage that the so-called "soft sector" system is not available. Described in more detail, information storage format data in each track, such as an ID field representing sector numbers and lengths of information recorded in a given sector, will be erased since and when the previously recorded information signals are erased completely.

SUMMARY OF THE INVENTION

It is accordingly an object of the invention to provide an improved technique for writing information on a magnetic disk by a simple single-gap magnetic head, which permits complete erasure of remnants of prior information signals on a selected track, irrespective of variations in relative position between the magnetic head and the magnetic disk, and which permits selection of storage sectors of the disk with signals recorded thereon. This and other objects of the invention are attained according to the invention, wherein there is provided an apparatus for writing information on a magnetic disk by means of a single-head magnetic head which is movable across a surface of the magnetic disk in radially inward and outward directions of the magnetic disk. The apparatus comprises: means for positioning the magnetic head on a centerline of a selected track of the magnetic disk, and writing information on the selected track over a first record width; means for moving the magnetic head to first and second predetermined positions in succession on opposite sides of the centerline of the selected track such that a width of the magnetic head overlaps corresponding opposite end portions of the first record width of the written information by first and second predetermined distances from opposite ends of the first record width, respectively; and means for erasing the opposite end portions of the first record width of the written information while the magnetic head is located in the first and second predetermined positions, respectively, whereby the written information is left over a second record width which is smaller than the first record width.

In the apparatus constructed as described above, the opposite end portions of the first record width of the written information (i.e., portions along opposite edges of the newly written band) are erased while the magnetic head is located in the first and second predetermined positions on opposite sides of the centerline of the selected track of the magnetic disk. Accordingly, the first record width in which the information is initially written, is slightly reduced to the second record width as a result of the erasure along the opposite edges of the newly recorded band, whereby otherwise possible remnants of the prior information adjacent to the opposite edges of the newly recroded band can be completely eliminated, irrespective of thermal expansion and eccentricity of the magnetic disk, and variations in the positioning accuracy of the magnetic head. Thus, the use of a relatively simple magnetic head makes it possible to erase the entirety of the previous recording on a selected track when the new information is written on the same track, thereby avoiding otherwise possible readout of the remnants of the prior information signal upon retrieval of the last recorded information from the selected track. Further, since the recorded band is erased only at its edge portions, the format data remains on the track and can be utilized when new information is written on that track. Namely, the arrangement according to the invention does not require mechanical means for detecting the index position of the disk, such as index holes formed therein, and permits the use of the so-called "soft-sector" system in which track sectors are selectable with recorded data.

According to another embodiment of the invention, there is provided an apparatus for writing information on a magnetic disk by means of a single-gap magnetic head which is movable across a surface of the magnetic disk in radially inward and outward directions of the magnetic disk, which apparatus comprises; means for positioning the magnetic head to a first predetermined position on one of opposite sides of a centerline of a selected track of the magnetic disk such that a width of the magnetic head overlaps one of opposite end portions of a first record width of previously written information by a first predetermined distance from corresponding one of opposite ends of the first record width; means for erasing said one of opposite end portions of the first record width of the previously written information while the magnetic head is located in the first predetermined position; means for moving the magnetic head into alignment with the centerline of the selected track, and for writing information on the selected track over a second record width; means for moving the magnetic head to a second predetermined position on the other side of the centerline of the selected recording track such that the width of the magnetic head overlaps one of opposite end portions of the second record width of the newly written information on said other side of said centerline, by a second predetermined distance from corresponding one of opposite ends of the second record width; and means for erasing said one of opposite end portions of the second record width of the newly written information while said magnetic head is located in said second predetermined position.

In the apparatus constructed as described above, the previously recorded band is erased at one of opposite end portions of its width (i.e., first record width) before new information is written on the same track. The newly written band is then erased at one of opposite end portions of its width (i.e., second width), on the side remote from the erased end portion of the first record width of the previously recorded band. The erasure of the previously recorded band along its one edge assures complete absence of the previous information signal adjacent to the corresponding edge of the newly recorded band. In addition, the erasure of the newly written information at the other edge of the newly recorded band removes a possibility that portions of the previous information signal might remain at that other edge due to thermal expansion and eccentricity of the magnetic disk, as well as positioning errors of the magnetic head. Thus, the same advantages as offered by the preceding arrangement are obtained from the instant arrangement.

According to a further embodiment of the invention, there is provided an apparatus for writing information on a single-gap magnetic head which is movable across a surface of the magnetic disk in radially inward and outward directions of the magnetic disk, which apparatus comprises: means for positioning the magnetic head to first and second predetermined positions in succession on opposite sides of a centerline of a selected track such that a width of the magnetic head overlaps corresponding opposite end portions of a record width of previously written information by first and second predetermined distances from opposite ends of the record width, respectively; means for erasing the opposite end portions of the record width of the previously written information while the magnetic head is located in the first and second predetermined positions, respectively; and means for moving the magnetic head into alignment with the centerline of the selected track, and writing information on the selected track over the above-indicated record width.

In the above embodiment, the opposite edge portions of the previously recorded band on the selected track are erased in advance of the recording of new information on that track, and the new information is written over the same record width as the previously recorded information. Consequently, the previous information signal will not remain at the opposite edge portions of the newly recorded band even with thermal expansion of the magnetic disk, eccentricity of the disk due to interchanging of disks, and positioning errors or variations of the magnetic head.

BRIEF DESCRIPTION OF THE DRAWING

The foregoing and other objects, features and advantages of the present invention will be better understood from reading the following detailed description of preferred embodiments, when considered in connection with the accompanying drawing, in which.

DETAILED DESCRIPTION OF THE PREFERRED EMBODIMENTS

The present invention will be described, referring to the accompanying drawing showing its preferred embodiments.

Figure 2:
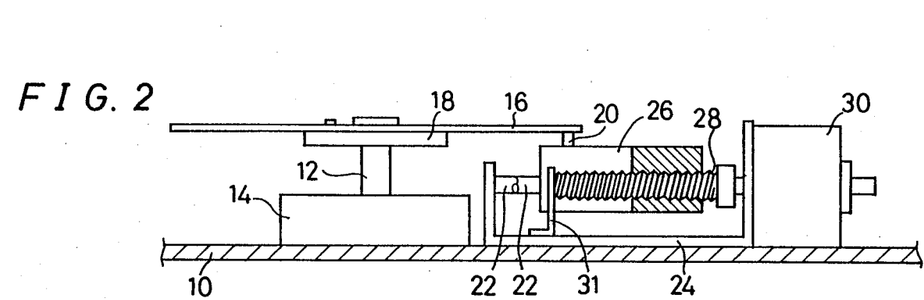
FIG. 2 is a fragmentary, front elevational view of one embodiment of a mechanical arrangement of the invention.

Referring to FIG. 2 which shows a part of a magnetic recording apparatus for use with a magnetic disk, there is illustrated a disk drive motor 14 with an output shaft 12, which is secured to a base 10 such that the output shaft 12 extends perpendicularly to the base 10. The output shaft 12 carries a circular support 18 fixed thereto for supporting a magnetic disk 16 such as a hard disk or a flexible or floppy disk. The magnetic disk 16 is rotated at a given speed by the disk drive motor 14, in a plane parallel to the base 10. A magnetic head 20 is moved across a surface of the magnetic disk 16 in radially inward and outward directions of the disk. More specifically, a pair of parallel guide rods 22 are supported by a support frame 24 such that the guide rods 22 lie in a plane parallel to the base 10. The guide rods 22 slidably support and guide a head carriage 26 which carries the magnetic head 20. To the support frame 24, there is secured a head drive stepper motor 30 for driving a feed screw 28 which extends in parallel with the guide rods 22. The feed screw 28 is threadedly connected to the head carriage 26 for linear movement of the latter through rotary action of the former. In this arrangement, a rotation motion of the head drive stepper motor 30 will cause the magnetic head 20 to be moved radially of the magnetic disk 16, whereby the magnetic head 20 may be positioned relative to the magnetic disk 16. Reference numberal 31 designates a biasing member which biases the feed screw 28 at its free end toward the stepper motor 30, for eliminating an axial play of the feed screw 28.

Figure 3:
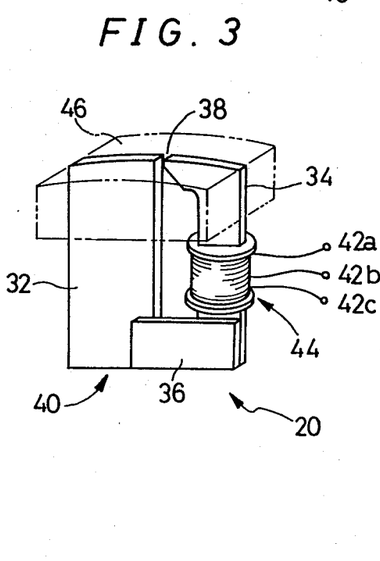
FIG. 3 is a fragmentary perspective view of the magnetic head of FIG. 2.

Referring next to the perspective view of FIG. 3 showing the basic construction of the magnetic head 20, a C-shaped core 40 comprises a first and a second yoke element 32, 34 made of ferrite, and a connecting element 36 which connects the first and second yoke elements 32, 34 at their one ends, so that the other ends of the yoke elements 32, 34 defines a single gap 38. Around the second yoke element 34 is wound a coil 44 which has three terminals 42a, 42b (intermediate tap) and 42c. Signals to magnetize the magnetic disk 16 in opposite directions for writing information thereon are produced with a current flow from the terminal 42a to the terminal 42b, and a current flow from the terminal 42c to the terminal 42b, respectively. The information signals recorded on the magnetic disk 16 are retrieved or read out based on an electromotive force induced between the end terminals 42a and 42c of the coil 44, and are erased with a DC current flow from the terminal 42a or 42c to the terminal 42b so as to magnetize the disk 16 in the same direction. Reference numeral 46 indicates a slider which cooperates with the end face of the core 40 having the gap 38, to define a contact surface with which the surface of the magnetic disk 16 is moved in sliding contact.

Figure 4:
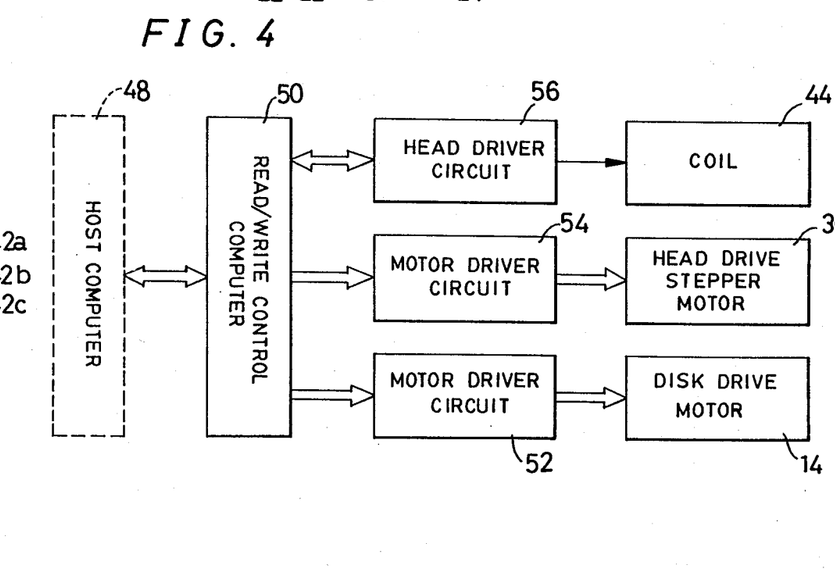
FIG. 4 is a block diagram of a control system of the embodiment of FIG. 2.

FIG. 4 shows a control system of the magnetic recording apparatus which has been described. In the figure, a read/write control computer 50 operates according to a stored program, to control a motor driver circuit 52 so that the driver circuit 52 supplies drive power to the disk drive motor 14 so as to operate the same at a predetermined speed. When information is read out from or written on the magnetic disk 16, the read/write control computer 50 receives a command from a host computer 48, and controls a motor driver circuit 54 to supply pulse signals to the head drive stepper motor 30 so as to position the magnetic head 20 at a selected track at an appropriate radial position on the magnetic disk 16. The information signals on the selected track are retrieved through the magnetic head 20 and a head driver circuit 56. The control computer 50 transfers the retrieved information signals to the host computer 48. When information from the host computer 48 is written on the selected track, the control computer 50 transfers information signals from the host computer 48 to the selected track on the magnetic disk 16 through the head driver circuit 56 and the magnetic head 20. Thus, the read/write control computer 50 serves as a recording controller and a readout controller.

Figure 5:
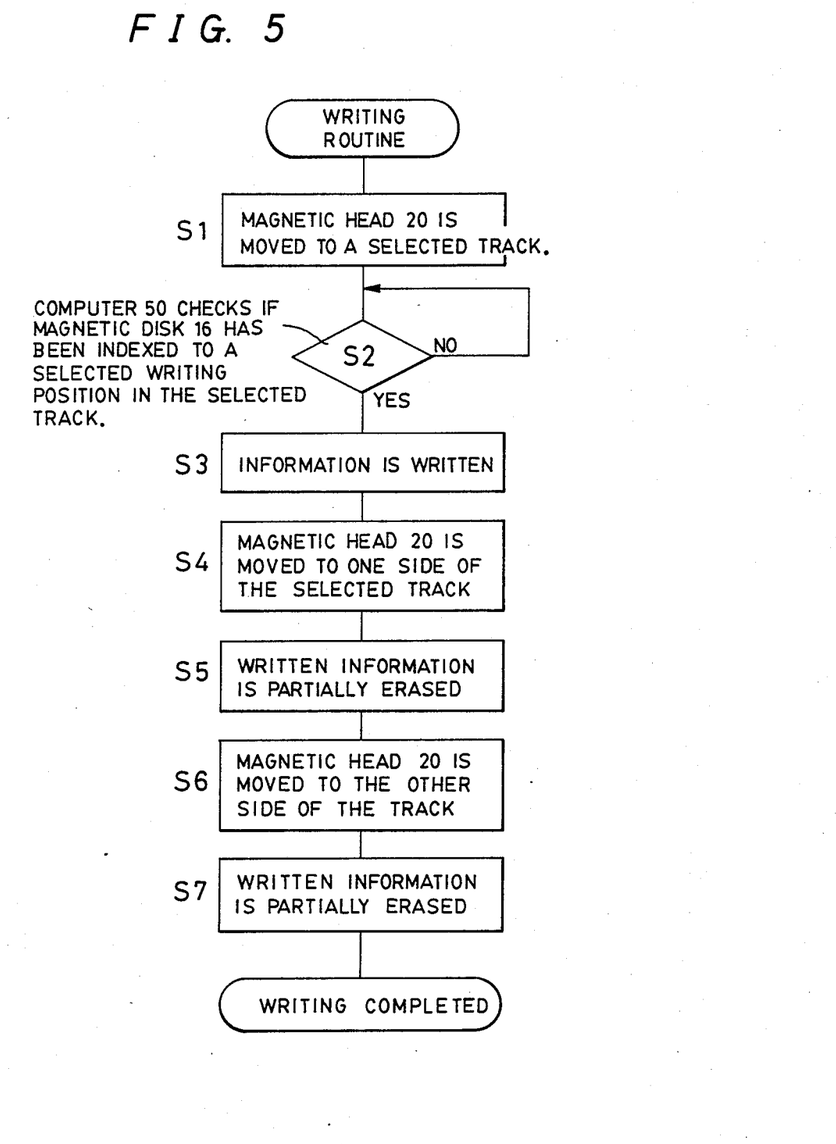
FIG. 5 is a flow chart showing the operation of the embodiment of FIG. 2.

Referring to the flow chart of FIG. 5, the operation to write information on the magnetic disk 16 will be described.

Figure 1:
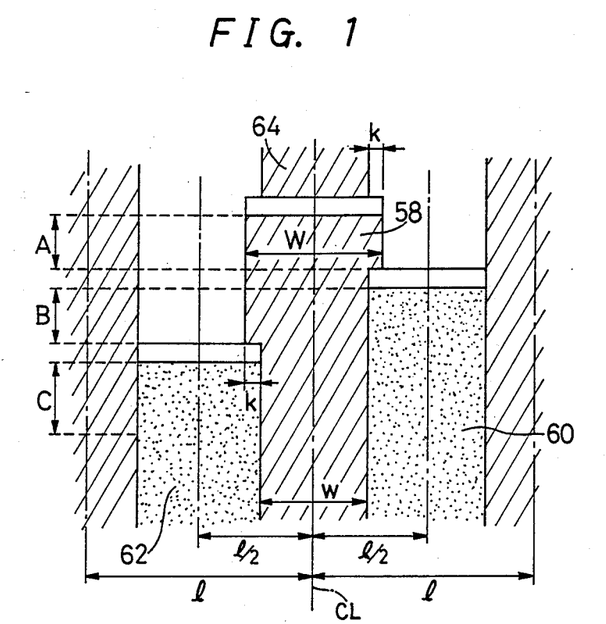
FIG. 1 is a view showing the relative positions of a magnetic head with respect to the centerline of a recording track where information is written and erased, according to one embodiment of the invention.
Figure 6:
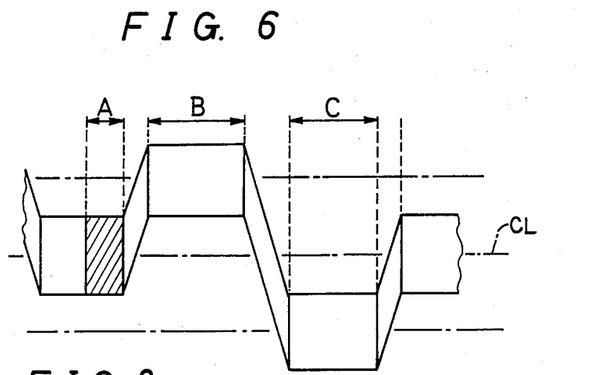
FIG. 6 is an illustration indicating movements of the magnetic head according to the operation of the flow chart of FIG. 5.

In response to a WRITE command from the host computer 48, the control computer 50 starts a writing routine which consists of a series of steps. In the first step S1, the head drive stepper motor 30 is actuated to position the magnetic head 20 on the centerline of a selected track. Step S1 is followed by step S2 in which the control computer 50 checks if the magnetic disk 16 has been indexed to a selected writing position (sector) in the selected track. This step S2 is repeated until the magnetic disk 16 has been indexed to the selected writing position. With the magnetic disk 16 located at the selected writing position, the control computer 50 goes to step S3 in which information signals from the host computer 48 are written on the selected writing position in the selected track, over a first record width W corresponding to the effective width of the magnetic head 20. Thus, means for executing steps S1 through S3 serves as recording means for recording information on the selected track. The checking in step S2 is accomplished, for example, by reading the data recording format, more precisely, data recorded in the ID field in the selected track, indicative of the writing positions (storage sectors) in that track. In this way, the selected writing position in the selected track is reached on the magnetic disk 16 while the disk 16 is being indexed. This process of writing information on the selected track of the magnetic disk 16, is indicated at A in FIGS. 1 and 6. In this connection, it is noted that FIG. 6 shows movements of the magnetic head 20 in the direction normal to the centerline of the selected track, and that FIG. 1 shows the relative positions of the magnetic head 20 with respect to the centerline of the selected track, where information is written and erased, that is, writing position 58 (written or record band) and erasing positions 60, 62 (erased bands). As indicated in FIG. 1, recording tracks on the magnetic disk 16 are spaced from each other by a distance of l in the radial direction. The centerline of the selected track is indicated at CL.

After the completion of step S3, the control computer 50 executes steps S4 to operate the head drive stepper motor 30 to move the magnetic head 20 to a first predetermined position on one of opposite sides of the centerline CL of the selected track such that the width of the magnetic head 20 overlaps corresponding one of the opposite end portions of the first record width W by a first predetermined distance "k" from the corresponding end of the width W. In the following step S5, the corresponding edge portion of the written band 58 which overlaps the width of the magnetic head 20 is erased. This erasing process is indicated at B in FIGS. 1 and 6. The distance of movement of the magnetic head 20 to one side of the centerline of the track is, for example, equal to l/2, i.e., one half of the spacing l between the tracks, which is equivalent to two pulse signals, for example, that are applied to the stepper motor 30. To accomplish the erasure, an erase signal is applied to the magnetic head 20 via the head driver circuit 56, for a minimum time span which is necessary for the magnetic disk 16 to be rotated one full turn. Thus, the above erasure in the instant embodiment may be achieved, without a strict control of erasing time as is required in a conventional "hard-sector" system in which the erasing time should be exactly regulated to prevent the erasure of sectors other than a given sector that is to be erased.

Subsequently, step S6 is executed to move the magnetic head 20 to a second predetermined position on the other side of the centerline CL of the selected track such that the width of the magnetic head 20 overlaps corresponding end portion of the first record width W by a second predetermined distance from the corresponding end of the width W. In this example, the second predetermined distance is equal to the first predetermined distance "k". Step S6 is followed by step S7 in which the corresponding edge portion of the written band 58 overlapping the width of the magnetic head 20 is erased, in the same manner as in the previously described step S5. This second erasing process is indicated at C in FIGS. 1 and 6. Thus, means for executing steps S4 through S7 serves as erasing means for erasing the opposite edge portions of the first record band 58.

As previously indicated, the erased bands 60 and 62 of FIG. 1 obtained in steps S5 and S7 overlap the opposite end portions of the first record width W of the written band 58 (formed in the writing process A), by the predetermined distance "k" from the respective edge of the band 58. This overlapping distance "k" is selected so that the first record width W of the written band 58 provided in the writing process A in step S3 completely covers a previously recorded band 64, irrespective of thermal expansion of the magnetic disk 16, and eccentricity of the disk 16 upon mounting thereof, as well as positioning variations of the magnetic head 20. Stated the other way, the first record width W of the newly written band 58 is reduced to a second record width w as a result of erasure at its opposite end portions by the erased bands 60, 62. That is, the entire record width w of the previously written band 64 is covered by the width W of the newly written band 58 which is larger than the width w. Hence, the instant arrangement is free from remnants of the prior information signal when new information is written and retrieved.

In the present embodiment as described hitherto, the previously written information on a selected track is wholly erased upon writing of new information, with a comparatively simple arrangement of the apparatus. Further, the erasure does not take place over the entire width of the previous record band, and therefore it is possible to write desired information in a desired sector of the selected track according to recording format data recorded on the magnetic disk 16. Namely, the information recording may be effected in the "soft-sector" system.

Moreover, the instant embodiment permits the use of a magnetic head of simple construction with a single-gap core, and does not require a sophisticated control for erasing only a selected sector on a part of the circumference of the selected track upon writing of new information. These features are conducive to simplicity and cost saving of the magnetic recording apparatus.

Another embodiment of the invention will be described next. In this modified embodiment, elements similar to those in the preceding embodiment will receive the same reference characters, and the repeated description thereof will not be provided.

While the preceding embodiment is adapted such that new information is first written in the band 58 and the written band 58 is then erased at the opposite end portions of its width, it is possible to erase the opposite end portions of the width of the previously written band 64 before the new information is written. The operation of this modified embodiment will be described, referring to the flow chart of FIG. 7.

Figure 7:
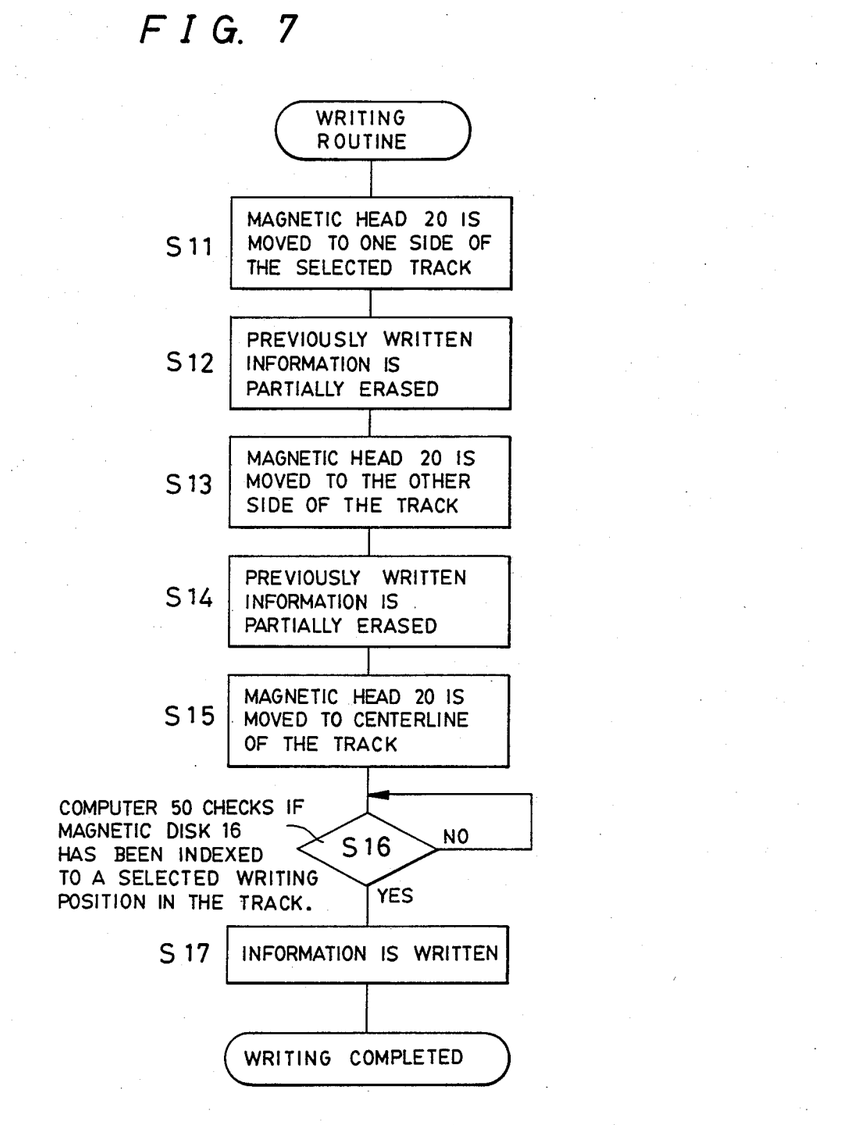
FIGS. 7, 8 and 9 are views of another embodiment of the invention, corresponding to FIGS. 5, 6 and 1, respectively.

In executing the writing routine, the control computer 50 first goes to step S11 in which the magnetic head 20 is moved to a first predetermined position on one of opposite sides of the centerline CL of the selected track such that the width of the magnetic head 20 overlaps corresponding end portion of a record width W of the previously written information by a predetermined distance "k" from the corresponding end of the width W. Then, the computer 50 goes to step S12 to form the erased band 60, which erases the previously written information at its end portion of the width W. This erasing process is indicated at B in FIGS. 8 and 9. Step S12 is followed by step S13 in which the magnetic head 20 is moved to a second predetermined position on the other side of the centerline of the selected track such that the width of the magnetic head 20 overlaps the other end portion of the record width W of the previous recording by the predetermined distance "k". In the next step S14, the erased band 62 is formed. Thus, each end portion of the width W of the previously written band 64 is erased by the overlapping distance "k". As a result, the width of the previously written band 64 is reduced to a smaller width w. The second erasing process is indicated at C in FIGS. 8 and 9. Thus, means for executing steps S11 through S14 serves as erasing means for erasing the opposite edge portions of the previously written band 64.

The computer 50 then goes to step S15 to move the magnetic head 20 into alignment with the centerline of the selected track, and to step S16 to check if the magnetic disk 16 has been indexed to a selected writing position in the selected track. With the disk 16 indexed in position, step S17 is executed, wherein new information signals from the host computer 48 are written in the band 58 over the width W larger than the width w. This writing process is indicated at A in FIGS. 8 and 9. Thus, means for executing steps S15 through S17 serves as recording means for writing information on a selected track.

Figure 8:
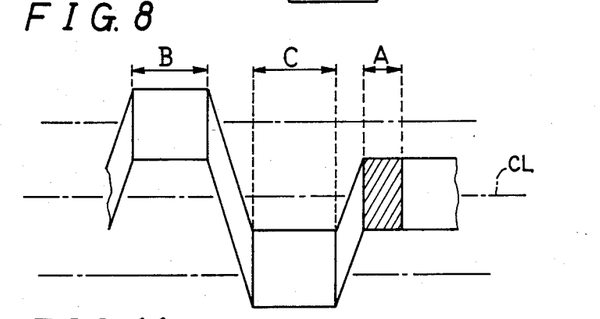
Figure 9:
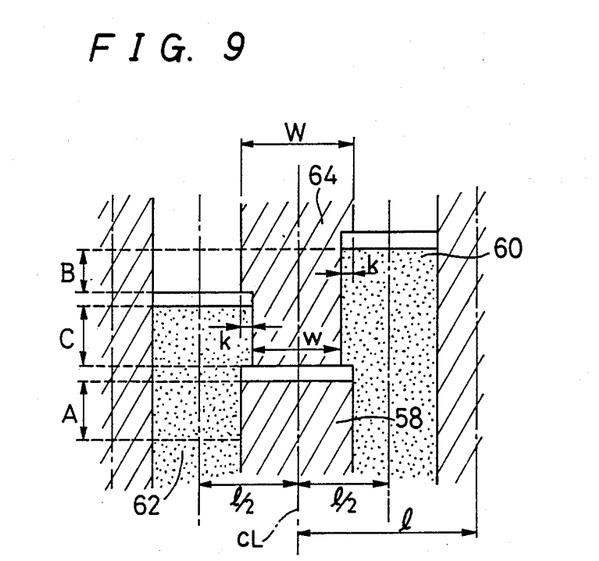

In this modified embodiment, too, the newly written band 58 covers the entirety of the reduced width w of the previously written band 64. Therefore, the same results as obtained in the preceding embodiment are achieved. Further, the instant embodiment provides an extra advantage that the magnetic head 20 is aligned with the centerline of the selected track upon completion of the writing process.

While the erased bands 60 and 62 are formed in succession in the above embodiment, it is possible that the erased bands 60 and 62 are formed before and after the written band 58 is formed, respectively. This alternative embodiment will be described, by reference to the flow chart of FIG. 10.

Figure 10:
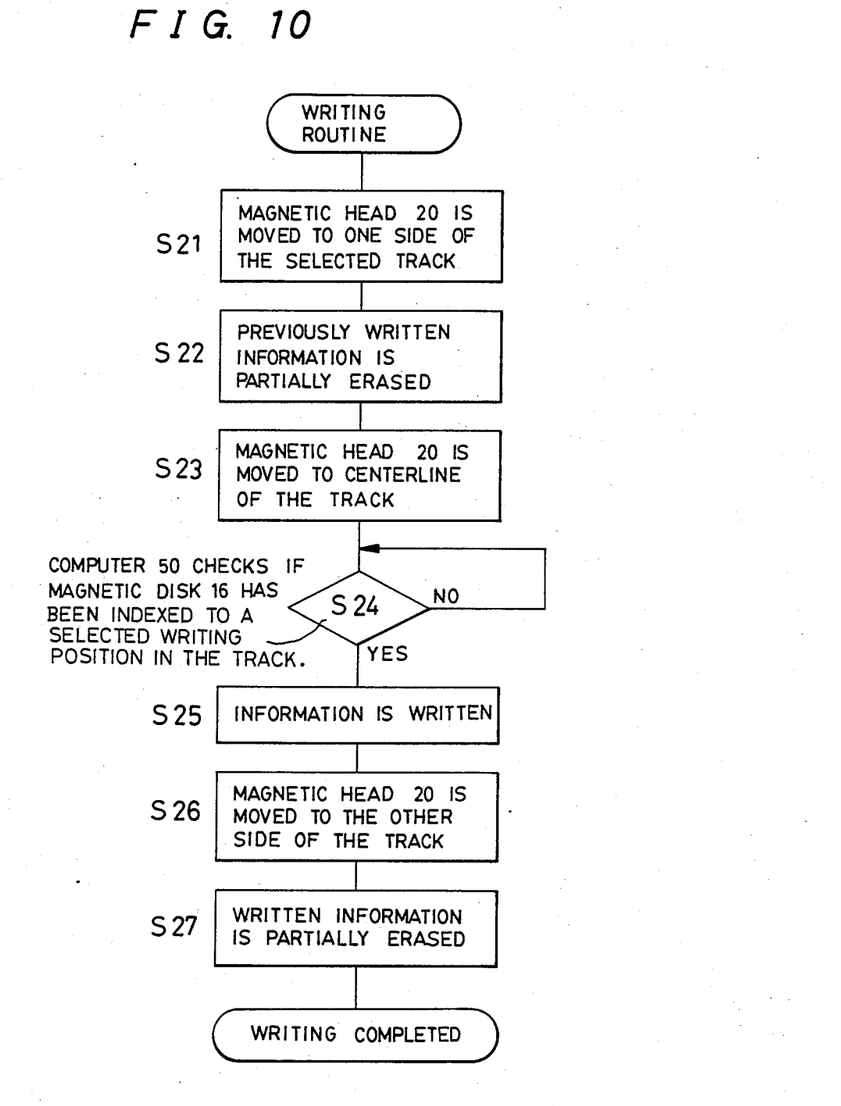
FIGS. 10, 11 and 12 are views of a further embodiment of the invention, corresponding to FIGS. 5, 6 and 1, respectively.
Figure 11:
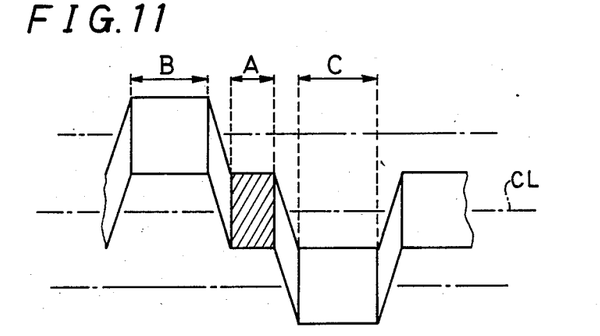
Figure 12:
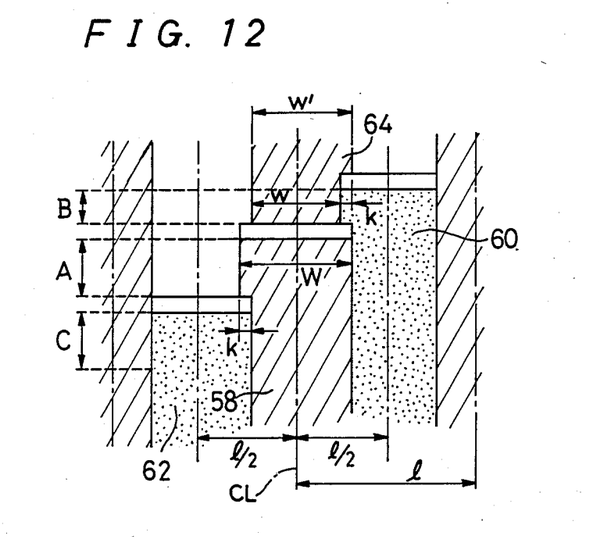

Initially, step S21 and S22 are executed to move the magnetic head 20 to one side of the selected track and form the first erased band 60, thereby erasing the corresponding end portion of a width w' of the previously written band 64. Therefore, the width w' of the previously written band 64 is reduced to a width w. This erasing process is indicated at B in FIGS. 11 and 12. Successively, the computer 50 goes to step S23 in which the magnetic head 20 is moved into alignment with the centerline of the selected track. The computer 50 then checks in step S24 to see if the magnetic disk 16 has been indexed into position. With the disk 16 brought into the selected index position, the computer 25 executes step S25 wherein new information signals from the host computer 48 are recorded as the newly written band 58 having a width W. This writing process is indicated at A in FIGS. 11 and 12. Subsequently, steps S26 and S27 are implemented to move the magnetic head 20 to the other side of the centerline of the selected track, and to form the second erased band 62, i.e., to erase the corresponding end portion of the newly written band 58 to the reduced width w'. This second erasing process is indicated at C in FIGS. 11 and 12. Thus, means for executing steps S21 and S22 serves as first erasing means, and means for executing steps S26 and S27 serves as second erasing means, while means for executing steps S23 through S25 serves as recording means.

As described above, the third embodiment is adapted so that the width w' of the previously written band 64 is reduced by a distance "k" to the width w before the new information is written in the band 58. Therefore, the width w of the previous band 64 is wholly covered by the larger width W of the band 58 when it is written, which provides the same results as obtained in the preceding embodiments.

While the present invention has been described in its preferred embodiments, it is to be understood that the invention is not confined to the precise disclosure contained herein, but may be otherwise embodied with various changes, modifications and improvements which may occur to those skilled in the art, without departing from the scope of the invention defined in the appended claims.

What is claimed is:

1. A method for writing information on a magnetic disk by means of a single-gap magnetic head, comprising the steps of:

selecting a track of the magnetic disk from a plurality of tracks, each track being divided into a plurality of sectors, each sector including recorded sector identification data;

positioning said magnetic head on a centerline of the selected track of the magnetic disk, and writing information on the selected track over a first record width;

moving said magnetic head to first and second predetermined positions in succession on opposite sides of said centerline of the selected track such that a width of the magnetic head overlaps corresponding opposite end portions of said first record width of the written information by first and second predetermined distances from opposite ends of the first record width, respectively; and erasing said opposite end portions of the first record width of the written infrmation while said magnetic head is located in said first and second predetermined positions, respectively, whereby the written information is left over a second record width which is smaller than said first record width;

wherein said first and second predetermined distances are small enough to avoid erasing said recorded sector identification data, and are large enough to accomodate variations in relative position between said magnetic head and said selected track.

2. An apparatus for writing information on a magnetic disk, including a single-gap magnetic head which is movable across a surface of said magnetic disk in raidally inward and outward directions of the magnetic disk, comprising:

a track selector for selecting a track of the magnetic disk from a plurality of tracks, each track being divided into a plurality of sectors, each sector including recorded sector identification data;

a recording controller operable to position said magnetic head on a centerline of a selected track of the magnetic disk to write information on the selected track over a first record width, and moving said magnetic head to first and second predetermined positions in succession on opposite sides of said centerline of the selected track such that a width of the magnetic head overlaps corresponding opposite end portions of said first record width of the written information by first and second predetermined distances from opposite ends of the first portions of the first record width of the written information are erased while said magnetic head is located in said first and second predetermined positions, respectively, whereby the written information is left over a second record width which is smaller than said first record width;

wherein said first and second predetermined distances are small enough to avoid erasing said recorded sector identification data, and are large enough to accomodate variations in relative position between said magnetic head and said selected track.

3. An apparatus according to claim 2, wherein said recording controller comprises:

recording means for positioning said magnetic head on the centerline of the selected track and writing the information over said first record width; and erasing means for moving said magnetic head to said first and second predetermined positions and erasing said opposite end portions of said first record width of the recorded information.

* * * * *